(12) United States Patent
Le et al.

(10) Patent No.: US 7,974,266 B2
(45) Date of Patent: Jul. 5, 2011

(54) METHOD AND APPARATUS FOR CLASSIFYING IP DATA

(75) Inventors: Franck Le, Irving, TX (US); Haihong Zheng, Coppell, TX (US)

(73) Assignee: Spyder Navigations L.L.C., Wilmington, DE (US)

( * ) Notice: Subject to any disclaimer, the term of this patent is extended or adjusted under 35 U.S.C. 154(b) by 730 days.

(21) Appl. No.: 11/778,822

(22) Filed: Jul. 17, 2007

(65) Prior Publication Data

US 2008/0037542 A1 Feb. 14, 2008

Related U.S. Application Data

(63) Continuation of application No. 09/834,918, filed on Apr. 16, 2001, now Pat. No. 7,246,173.

(51) Int. Cl.
*H04L 12/28* (2006.01)

(52) U.S. Cl. .................................. 370/351; 370/392

(58) Field of Classification Search .................... None
See application file for complete search history.

(56) References Cited

U.S. PATENT DOCUMENTS

| | | | | |
|---|---|---|---|---|
| 5,903,559 | A * | 5/1999 | Acharya et al. | 370/355 |
| 6,157,955 | A | 12/2000 | Narad et al. | |
| 6,212,185 | B1 | 4/2001 | Steeves et al. | |
| 6,262,983 | B1 | 7/2001 | Yoshizawa et al. | |
| 6,272,540 | B1 | 8/2001 | Yadav et al. | |
| 6,401,117 | B1 | 6/2002 | Narad et al. | |
| 6,421,730 | B1 | 7/2002 | Narad et al. | |
| 6,452,915 | B1 | 9/2002 | Jorgensen | |
| 6,594,268 | B1 * | 7/2003 | Aukia et al. | 370/400 |
| 6,636,509 | B1 * | 10/2003 | Hughes | 370/389 |
| 6,674,760 | B1 * | 1/2004 | Walrand et al. | 370/411 |
| 6,683,885 | B1 * | 1/2004 | Sugai et al. | 370/423 |
| 6,882,655 | B1 * | 4/2005 | Isoyama et al. | 370/415 |
| 6,898,641 | B1 * | 5/2005 | Kobayashi | 709/238 |
| 6,970,462 | B1 * | 11/2005 | McRae | 370/392 |
| 6,985,436 | B1 * | 1/2006 | Bhaskar | 370/229 |
| 7,046,665 | B1 * | 5/2006 | Walrand et al. | 370/392 |
| 7,058,728 | B1 * | 6/2006 | Eklund | 709/247 |
| 2001/0005381 | A1 * | 6/2001 | Sugiyama | 370/466 |
| 2002/0024974 | A1 * | 2/2002 | Karagiannis et al. | 370/516 |
| 2003/0133411 | A1 * | 7/2003 | Ise et al. | 370/230 |
| 2004/0213267 | A1 * | 10/2004 | Nagao | 370/395.43 |

OTHER PUBLICATIONS

Internet Draft entitled "RSVP Support for Mobile IP Version 6 in Wireless Environments", Fankhauser et al., Nov. 1998, pp. 1-22.
Deering et al., "Internet Protocol Version 6 (IPv6)" *IETF*, Dec. 1998, XP002216844, URL: http://www.faqs.org/ftp/rfc/pdf/rfc2460.txt.pdf, retrieved Oct. 15, 2002, pp. 1-39.
Baker, F., "Requirements for IP Version 4 Routers" *IFTF*, Jun. 1995, XP002241070, URL: http://www.faqs.org/ftp/rfc/pdf/rfc1812.txt.pdf, retrieved May 14, 2003, pp. 1-175.
International Search Report for PCT/IB2002/00450 mailed on Jul. 15, 2002.
International Preliminary Examination Report for PCT/IB2002/00450 completed on Mar. 10, 2003.
Written Opinion for PCT/IB2002/00450 mailed on Dec. 27, 2002.
Supplementary European Search Report for application No. EP 02 71 1150 completed on Jun. 18, 2004.
Communication for European application No. 02 71 1150 dated Sep. 17, 2004.

* cited by examiner

*Primary Examiner* — Phirin Sam

(57) ABSTRACT

A method and methodology are provided for classifying Internet Protocol (IP) data in a packet switch network. Data may be received at a first node and classified based on source routing information of said data. The source routing information may be provided within LSRR/SSRR of IPv4 data or may be provided within a routing header of Ipv6 data.

34 Claims, 5 Drawing Sheets

FIG. 2A

LSRR

```
+--------+--------+--------+--------//--------+
|10000011| length | pointer|    route data    |
+--------+--------+--------+--------//--------+
  Type=131
```

FIG. 2B

SSRR

```
+--------+--------+--------+--------//--------+
|10001001| length | pointer|    route data    |
+--------+--------+--------+--------//--------+
  Type=137
```

METHOD AND APPARATUS FOR CLASSIFYING IP DATA

BACKGROUND OF THE INVENTION

1. Field of the Invention

The present invention relates to quality of service (QoS) for a stream of packets. More particularly, the present invention relates to Internet Protocol version 6 (IPv6) that uses both RSVP and routing headers and to Internet Protocol version 4 (IPv4) source routing.

2. Description of Related Art

In packet switched networks, packets may be transmitted between nodes coupled to the network to effect communication between the nodes. Information in the packets may include messages and commands such as a request for service, connection managements controls, or data. Large transmissions may be divided into packets instead of being transmitted as one long string.

The Internet is, for example, a packet switched network. Internet Protocol (IP) is an Internetwork protocol that defines how to format various information into packets and transmit those packets using the Internet. IP provides a near universal delivery system that can operate on almost any underlying network.

IP may be defined according to IPv4 with the "v4" indicating version 4 of the Internet Protocol. IPv4 serves what could be called the computer market. The focus of IPv4 is to couple computers together to permit communications over various networks where the computers range from personal computers (PCs) to supercomputers. Most of the computers are attached to local area networks (LANs) and the vast majority are not mobile.

The next generation Internet Protocol is IPv6 with the "v6" indicating version 6 of the Internet Protocol. IPv6 is intended to be compatible with IPv4 while addressing the needs of high performance networks (e.g., ATM) and low bandwidth networks (e.g., wireless). IPv6 also provides a platform for new Internet functionality that may be required in the future (e.g., telephony, television, video on demand, equipment control).

SUMMARY OF THE INVENTION

Embodiments of the present invention provide a method of classifying Internet Protocol (IP) data to be sent from a source apparatus to a destination apparatus in a packet switch network. This may include receiving the data (including a routing header) at a first node and classifying the data at the first node based on source routing information of the data. The source routing information may be provided within a destination field of a routing header for IPv6 or may be provided within LSRR/SSRR of the data for IPv4.

The method may also include reserving resources of nodes from the source apparatus to the destination apparatus. This may include forwarding a request from the source apparatus to the first node.

The routing header may include a segments left field, a first destination address field and a last destination address field. Classifying may be based on the last destination address field of the routing header.

The method may additionally include forwarding the data from the first node to the second node and classifying the data at the second node based on source routing information of the data.

Embodiments of the present invention may also provide a router for use in a packet switched network for transmission of Internet Protocol (IP) data to be sent from a source apparatus to a destination apparatus. The router may include a receiving device to receive the IP data at a first node and a processor device coupled to the receiving device to receive the IP data and to classify the data at the first node based on source routing information.

BRIEF DESCRIPTION OF THE DRAWINGS

Embodiments of the present invention will be described in detail with reference to the following drawings in which like reference numerals refer to like elements and wherein:

FIG. 2A illustrates a format of an LSRR packet for IPv4;

FIG. 2B illustrates a format of an SSRR packet for IPv4;

DETAILED DESCRIPTION OF PREFERRED EMBODIMENTS

Figure 1:
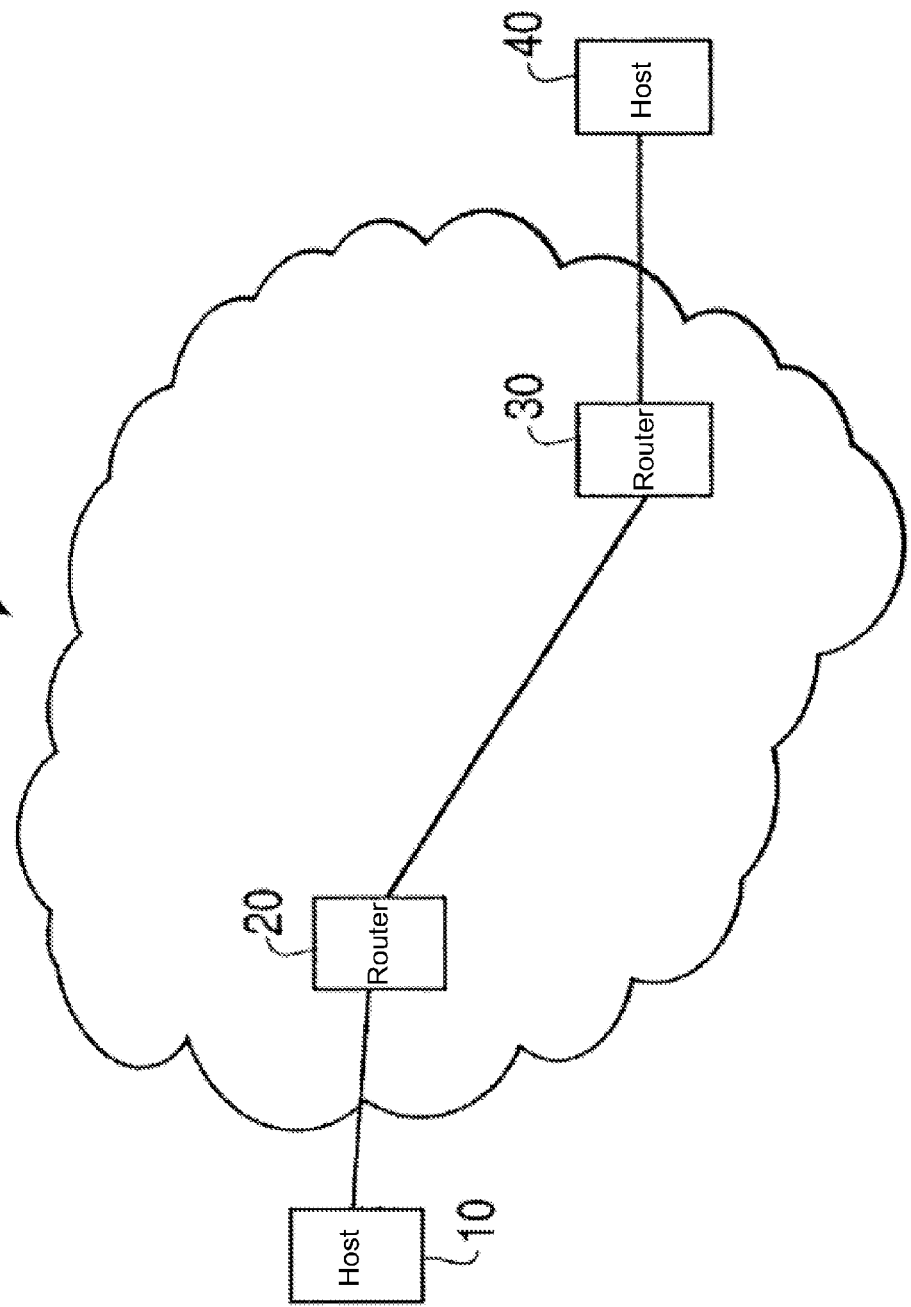
FIG. 1 is an example packet switched network.

Embodiments of the present invention may operate in a packet switched network 100. As illustrated in FIG. 1, a first host (or source apparatus) 10 may be coupled to the packet switched network 100 by a first router 20. The first router 20 may serve as an interface between the first host 10 and the packet switched network 100. Transmission may be conducted from the first router 20 to any one of a number of routers within the packet switched network 100 such as a second router 30. The second router 30 may couple a second host 40 to the packet switched network 100. Thus, the second router 30 interfaces the second host (or destination apparatus) 40 to the packet switched network 100. Transmission can be conducted from the first host 10 to the second host 40 via the first router 20 and the second router 30, as one example.

A characteristic of IPv4 and IPv6 is the use of an IP header of a particular format for each of the packets for identifying the source, destination and other information related to the packet. The routing header may identify one or more intermediate nodes to be visited by the packet on the way to the destination.

Source routing has been specified in both IPv4 and IPv6 to provide a means for the source apparatus to list one or more intermediate nodes to be visited on the way to a packet's destination.

In IPv4, a loose source and record route (LSRR) option and a strict source and record route (SSRR) option are provided for source routing. FIG. 2A illustrates a packet format for the LSSR option and FIG. 2B illustrates a packet format for the SSRR option.

The source apparatus may put the address of the first to intermediate router it wants the packet to visit in a destination address field in the IP header, and the addresses of the remaining routers the packet will visit in the route data field inside the LSRR option or the SSRR option. The address of the real destination to which the packet is sent may be put at the end of the route data field inside the LSRR option or the SSRR option. The intermediate router, whose address is in the destination address field in the packet, may replace the destination address field with the next address in the source route. Therefore, before the source routing has been consumed completely (i.e., the pointer field is not greater than the length field in the LSRR option or the SSRR option), the destination address does not carry the address of the final destination.

Figure 3:
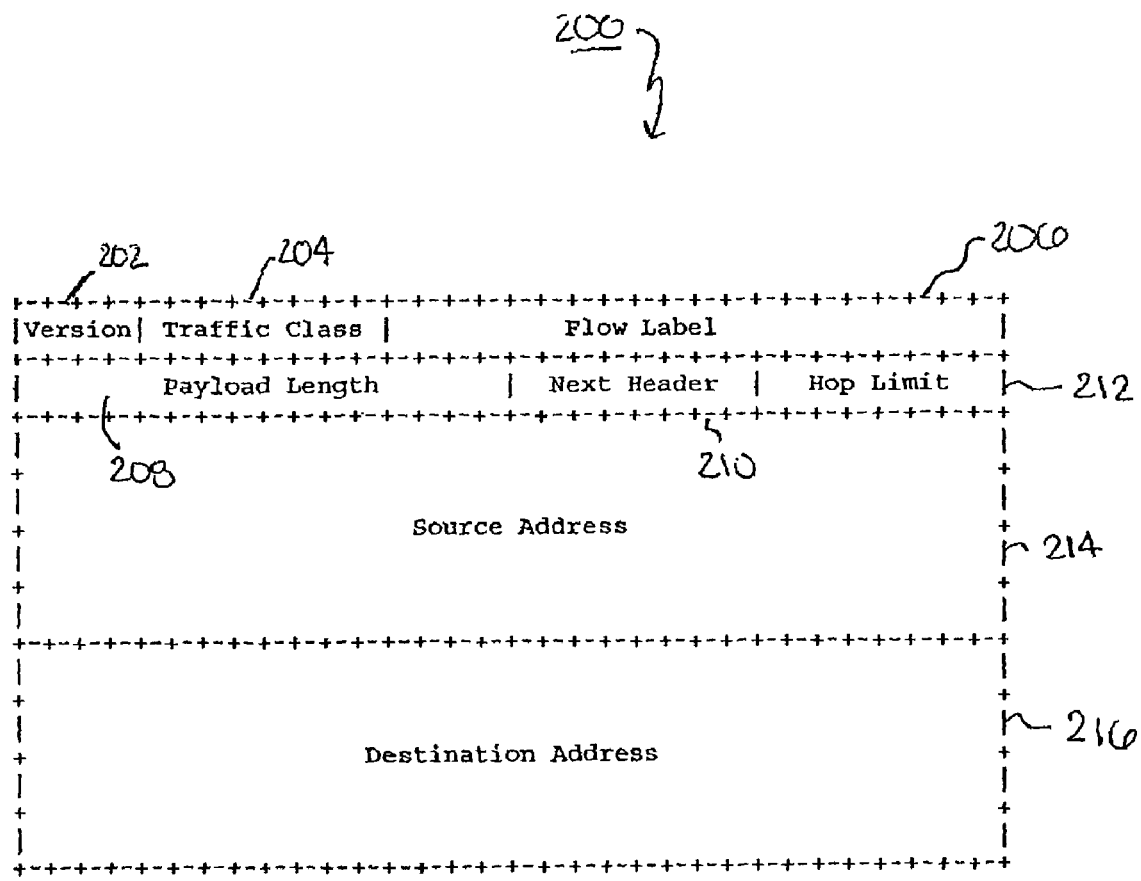
FIG. 3 illustrates a format of an IP header for IPv6.
Figure 4:
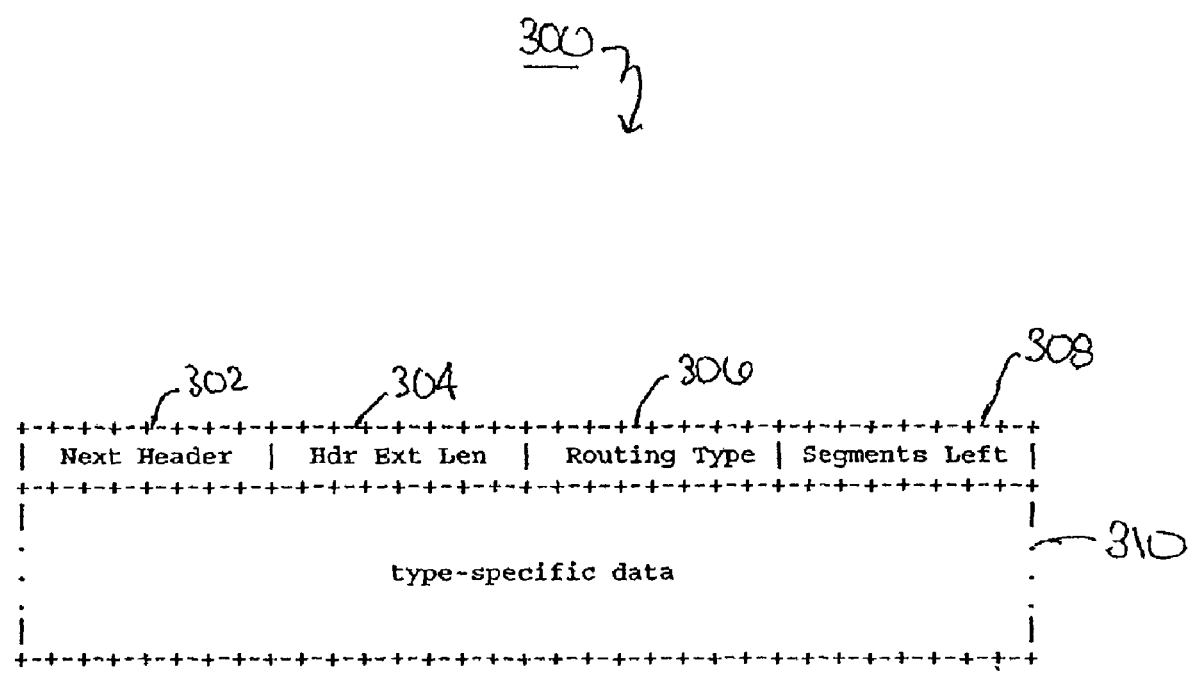
FIG. 4 illustrates a format of routing headers for IPv6.
Figure 5:
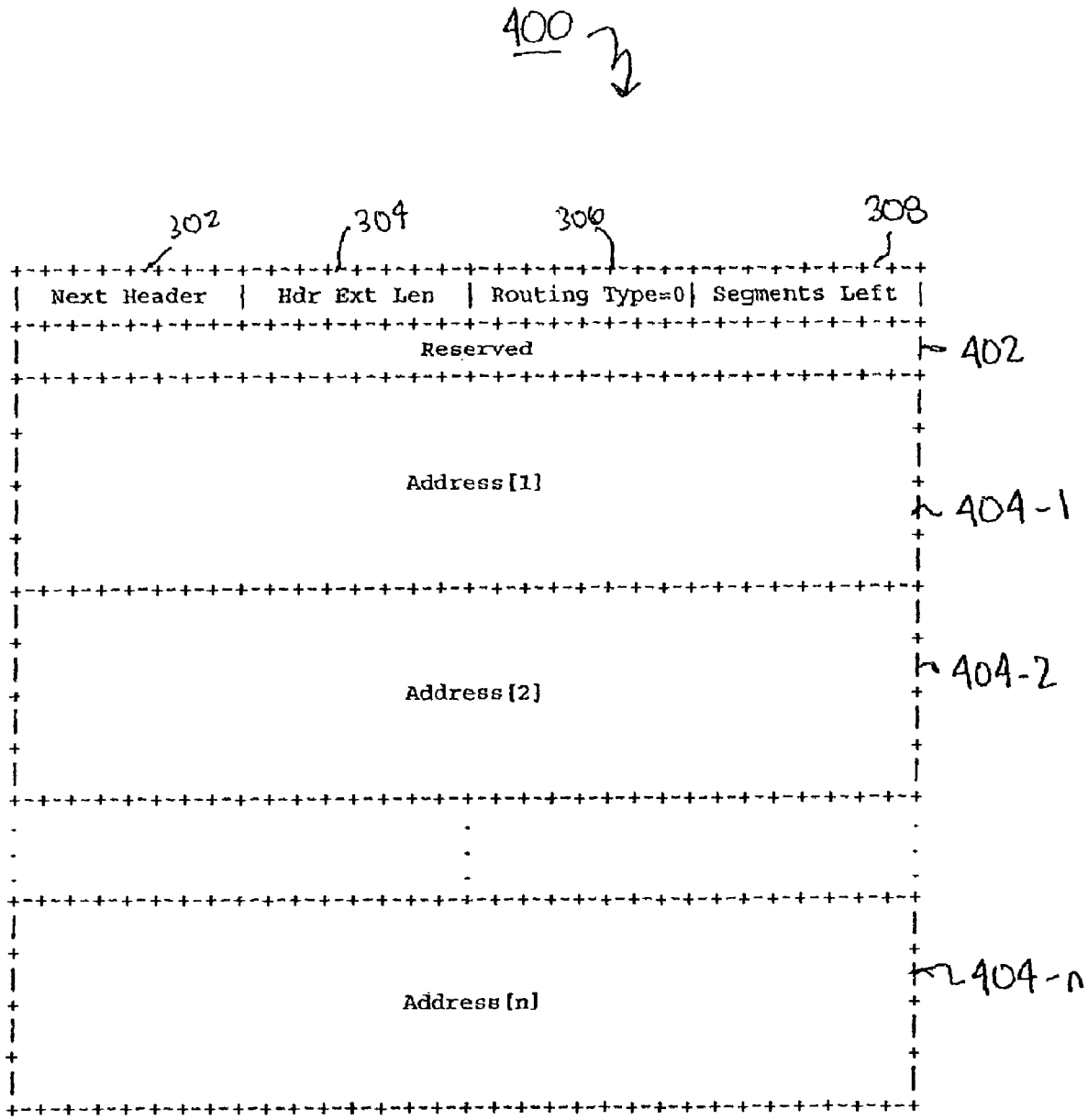
FIG. 5 illustrates a format of routing headers for IPv6.

FIG. 3 illustrates the format of an IP header for IPv6 and FIGS. 4 and 5 illustrate the format of routing headers for IPv6.

The IP header 200 illustrated in FIG. 3 includes the following fields: a version field 202, a traffic class field 204, a flow label field 206, a payload length field 208, a next header field 210, a hop limit field 212, a source address field 214 and a destination address field 216.

The version field 202 may store information indicating the IP version number to which the packet corresponds. The traffic class field 204 may store information indicating the desired delivery priority of the packet relative to other packets and the flow label field 206 may store information indicating that the packet requires special handling (such as a non-default quality of service). The payload length field 208 may store information indicating the length of the rest of the packet following the IP header. The next header field 210 may store information identifying the type of header immediately following the IP header and the hop limit field 212 may store a value indicating the maximum number of hops permitted for the packet, wherein the value may be decremented by one by each node that forwards the packet and the packet is discarded if the value is decremented to zero. The source address field 214 may store the address of the initial sender (i.e., the source apparatus) of the packet and the destination address field 216 may store the address of the intended recipient (i.e., the destination apparatus) of the packet.

The routing header 300 illustrated in FIG. 4 includes the following fields: a next header field 302, a header extension length field 304, a routing type field 306, a segments left field 308 and a type-specific data field 310. The next header field 302 may store information identifying the type of header immediately following the routing header. The header extension length field 304 may store information indicating the length of the routing header. The routing type field 306 may store information indicating the variant of the routing header. The segments left field 308 may store a value indicating the number of route segments still remaining to be visited by the packet before the destination is reached, and the type-specific data field 310 may store information including addresses of the nodes to be visited by the packet.

FIG. 5 illustrates a routing header 400 where the routing type field 306 has a value of "0." This identifies the Z routing header as a Type 0 routing header. The Type 0 routing header 400 illustrated in FIG. 5 includes all the same fields as shown in the routing header 300 (FIG. 4) with the exception of a reserved field 402 and address fields 404-1 to 404-n. The reserved field 402 may be initialized by the source and can be used in any manner by the intermediate nodes. The address fields 404-1 and 404-n include a sequence of addresses of nodes to which the packet is to be routed. This includes the address of the destination. For the Type 0 routing header 400, the bits of the reserved field 402 are all set to "0."

The source apparatus (such as the first host 10) puts the address of the first router (such as the first router 20) the packet should visit in the destination address field 216 of the IP header, and the addresses of the remaining routers in the address list 404-1-404-n of the routing header. The address of the real destination may be put in the last entry (or last destination address field) in the address list (i.e., the Address[n] field 404-n). The segments left field 308 in the routing header may indicate the number of intermediate routers still to be visited before reaching the final destination. Therefore, before the segments left field 308 reaches zero, the destination address field 216 in the IP header carries the address of an intermediate node, rather than the address of the final destination. This may be undesirable as will be described below.

Embodiments of the present invention are applicable to RSVP, which is a resource reservation setup protocol designed for an integrated services Internet. RSVP protocol may be used by a host (or source apparatus) to request specific qualities of service (QoS) from the network for particular application data streams or flows. RSVP may also be used by routers to deliver quality-of-service (QoS) requests to all nodes along the path(s) of the flows and to establish and maintain the state of the requested service. RSVP requests may result in resources being reserved in each node along the data path from a source to a destination.

A single reservation in a RSVP node is defined for a particular triple: (session, outgoing interface, Filter_spec_list). The session object, which consists of the triple: (DestAddress, ProtocolId[, Destport]), defines a RSVP session. The filter spec_list consists of the pair: (SrcAdress, SrcPort or Flow Label) and defines a subset of session data packets that should receive the desired QoS. The reservation specification for the particular triple may be held in a traffic control state block (TCSB) in a RSVP node. Therefore, upon receiving an incoming packet, a RSVP node may first determine which session it belongs to based on the Destination Addresses, the ProtocolId and the optional Destination Port.

Such classification procedure may perform correctly if there is no source routing. However, the following conditions may lead to incorrect session classification.

Condition A: In IPv4, if the LSRR option or the SSRR option is present and the source routing hasn't been consumed completely. That is, the pointer field is not greater than the length field in the LSRR option or the SSRR option.

Condition B: If the IPv6v routing header is present and the source routing hasn't been consumed completely. That is, the segments left field 308 is not zero.

If one of these conditions is met, then the destination address field in the IP packet may carry the address of the next router it wants to visit rather than the final destination address in the session object in the traffic control state block. This may cause the packet to not receive the requested QoS until the source routing has been consumed completely.

Embodiments of the present invention may be provided within each of the routers such as the first router 20 and the second router 30 (FIG. 1) in order to perform a classification method. In accordance with embodiments of the present invention, a classification method may be provided for RSVP to allow correct classification of packets. This may solve problems of classifying a flow when a routing header is present in an IPv6 packet. More specifically, in order to classify a session correctly and provide the desired QoS, the session classification may be based on the final destination address, which could be carried in the destination address field in the IP packet in the IPv4 LSRR/SSRR option or in the IPv6 routing header.

The classification algorithm for IPv4 may be as follows:

If the LSRR option and the SSRR option are not present, then the session classification is based on the destination address field in the IP header.

If the LSRR option and the SSRR option are present and the pointer field is greater than the length field, then the session classification is based on the destination address field in the IP header.

If the LSRR option or the SSRR option are present and the pointer field is not greater than the length field, then the session classification is based on the last IP address in the route data field. The last IP address in the route data field starts from the ("length"–3)-th octet of the LSRR option or the SSRR option.

The classification algorithm for IPv6 may be as follows:

If a Type 0 routing header is not present, then the session classification is based on the destination address field 216 in the IP header.

If a Type 0 routing header is present and the segments left field 308 is zero, then the session classification is based on the destination address field 216 in the IP header.

If a Type 0 routing header is present and the segments left field is not zero, then the session classification is based on the last IP address in the address list (i.e., the address field 404-n). The last IP address may start from the ((Hdr Ext Len"+1)*8−15))-th octet of the routing header.

Accordingly, embodiments of the present invention classify data based on source routing information of the data. The source routing information may be carried in the routing header for IPv6 and in the LSRR/SSRR option in IPv4.

Stated differently, when an RSVP node (i.e., the first router 20 or the second router 30) receives an IPv6 packet having a routing header and the segments left field 308 (FIG. 3) is not 0, then the router may classify the destination of the flow based on the source address and the last address field (404-n) in the routing header. This is the real address of the node that the RSVP message is sent to. This differs from disadvantageous arrangements in which routers classify the destination of the flow based on the destination address field 216 in the IPv6 packet.

When a source apparatus sends a PATH or RESV message, the real destination address may be specified in the session specification. When intermediate RSVP routers receive the RESV message, they perform resource reservation for the address specified in the session object. Accordingly, when the RSVP router receives an IPv6 packet, the destination address field in the IP header is compared with the session object to see whether it matches the existing reservations or not and whether the requested QoS can be provided. Therefore, when an RSVP router receives an IPv6 packet with a routing header whose segments left field 308 is not 0, then the flow may be classified using the destination address field 216 that contains the address of the next node the packet wants to visit. This node may not be the real address of the destination. Accordingly, this classification method may not match the flow with the reservation and the flow may not be able to obtain the resources reserved for it.

Therefore, in accordance with embodiments of the present invention, when an RSVP node receives an IPv6 packet with the presence of a routing header and the segments left field is not 0, the node (i.e., the router) may classify the destination of the flow based on the last entry in the routing header (i.e., the address field 404-n). This may be the real address node that the RSVP is to be sent to rather than the destination address field in the IPv6 packet (as in disadvantageous arrangements). This solves the problem of classifying a flow when a routing header is present in the IPv6 packet.

When embodiments of the present invention are used, a PATH refresh message originated from intermediate routers may include the source routing information that is carried in the latest PATH message sent from the endpoint (i.e., the source) so that the PATH refresh may store the routers that the endpoints require. In order for the intermediate RSVP routers to send PATH refresh, the routers may keep the state of the source routing information (i.e., the routing header in the IP packet that carries the latest PATH message it receives) in a memory device. Accordingly, source routing information may be added into the path state block (PSB). When the intermediate router sends a PATH refresh, the router may check if the source routing information is valid in the path state block. If it is valid, then the router may send the PATH message with a IPv6 routing header that carries the source routing information.

While the invention has been described with reference to specific embodiments, the description of the specific embodiments is illustrative only and is not to be considered as limiting the scope of the invention. That is, various other modifications and changes may occur to those skilled in the art without departing from the spirit and scope of the invention.

What is claimed is:

1. A method of classifying data comprising:
  receiving Internet Protocol (IP) data at a first node;
  classifying the IP data received at the first node based on a last destination address entry of a plurality of destination address entries in a header of the IP data; and
  forwarding the IP data from the first node to a second node, wherein the IP data is classified at the second node based on the last destination address entry of the plurality of destination address entries in the header of the IP data.

2. The method of claim 1, wherein the IP data is defined according to an Ipv6 protocol.

3. The method of claim 2, wherein the header of the IP data comprises a segments left field configured to store a value indicating a number of route segments yet to be visited by the IP data before reaching a destination.

4. The method of claim 3, wherein the classifying the IP data comprises only classifying the IP data based on the last destination address entry if the value of the segments left field is not zero.

5. The method of claim 2, wherein the header of the IP data comprises a plurality of address fields configured to store the plurality of destination address entries.

6. The method of claim 5, wherein the plurality of address fields includes at least one intermediate destination address field indicating an intermediate node through which the IP data is routed.

7. The method of claim 6, wherein the header of the IP data comprises a segments left field configured to store a value indicating a number of intermediate nodes yet to be visited by the IP data before reaching a destination node.

8. The method of claim 1, wherein the IP data is defined according to an Ipv4 protocol.

9. The method of claim 8, wherein the header of the IP data includes a loose source and record route (LSRR) option and a strict source and record route (SSRR) option.

10. The method of claim 9, wherein at least one of the LSRR option or the SSRR option comprises a route data field, and wherein the last destination address entry is a final destination node entry in the route data field.

11. The method of claim 10, wherein the route data field includes a plurality of intermediate node address entries.

12. The method of claim 1, further comprising reserving resources of nodes at the first node.

13. The method of claim 1, wherein the reserving resources comprises receiving a request from a source apparatus at the first node.

14. The method of claim 1, further comprising storing source routing information at the first node.

15. The method of claim 1, further comprising receiving a PATH refresh message from an intermediate node, wherein the PATH refresh message includes source routing information included in a most recent PATH message sent from a source apparatus, and wherein the PATH refresh message includes intermediate node address entries of a route between the first node and a destination node.

16. A router comprising:
  a receiver configured to receive Internet Protocol (IP) data at the router;
  a processing device configured to classify the IP data at the router based on a last destination address entry of a plurality of destination address entries in a header of the IP data; and a forwarding device configured to forward the IP data from the router to a node, wherein the IP data is classified at the node based on the last destination address entry of the plurality of destination address entries in the header of the IP data.

17. The router of claim 16, wherein the IP data is defined according to an Ipv6 protocol.

18. The router of claim 17, wherein the header of the IP data comprises a segments left field configured to store a value indicating a number of route segments yet to be visited by the IP data before reaching a destination.

19. The router of claim 18, wherein the processing device is configured to classify the IP data based on the last destination address entry only if the value of the segments left field is not zero.

20. The router of claim 18, wherein the header of the IP data comprises a plurality of address fields configured to store the plurality of destination address entries.

21. The router of claim 20, wherein the plurality of address fields includes a first destination address field and a last destination address field, and wherein the processing device is further configured to classify the IP data based on the last destination address field.

22. The router of claim 20, wherein the plurality of address fields includes at least one intermediate destination address field indicating an intermediate node through which the IP data is routed.

23. The router of claim 22, wherein the header of the IP data comprises a segments left field configured to store a value indicating a number of intermediate nodes yet to be visited by the IP data before reaching a destination node.

24. The router of claim 16, wherein the IP data is defined according to an Ipv4 protocol.

25. The router of claim 24, wherein the header of the IP data includes a loose source and record route (LSRR) option and a strict source and record route (SSRR) option.

26. The router of claim 25, wherein at least one of the LSRR option or the SSRR option comprises a route data field, and wherein the last destination address entry is a final destination node entry in the route data field.

27. The router of claim 26, wherein the route data field includes a plurality of intermediate node address entries.

28. The router of claim 16, wherein the receiver is configured to receive the IP data from a source apparatus.

29. The router of claim 16, wherein the processing device is further configured to reserve resources of nodes.

30. The router of claim 16, wherein the receiver is further configured to receive a request from a source apparatus.

31. The router of claim 16, further comprising a memory configured to store source routing information.

32. The router of claim 16, wherein the receiver is further configured to receive a PATH refresh message from an intermediate node, wherein the PATH refresh message includes source routing information included in a most recent PATH message sent from a source apparatus, and wherein the PATH refresh message includes intermediate node address entries of a route between the router and a destination node.

33. The method of claim 1 wherein classifying the IP data comprises determining a session belonging to the IP data based on the last destination address entry of the plurality of destination address entries in the header of the IP data.

34. The router of claim 16 wherein the processing device is further configured to determine a session belonging to the IP data based on the last destination address entry of the plurality of destination address entries in the header of the IP data.

* * * * *

UNITED STATES PATENT AND TRADEMARK OFFICE
CERTIFICATE OF CORRECTION

PATENT NO.        : 7,974,266 B2                                              Page 1 of 1
APPLICATION NO.   : 11/778822
DATED             : July 5, 2011
INVENTOR(S)       : Le et al.

It is certified that error appears in the above-identified patent and that said Letters Patent is hereby corrected as shown below:

Title page, item (56), above "Other Publications", in Column 2, Line 13, above "OTHER PUBLICATIONS" insert -- FOREIGN PATENT DOCUMENTS
WO  99/59303  11/1999  Niklas et al. --.

Title page, item (57), under "Abstract", in Column 2, Line 6, delete "Ipv6" and insert -- IPv6 --.

Column 6, line 16, in Claim 2, delete "Ipv6" and insert -- IPv6 --.

Column 6, line 37, in Claim 8, delete "Ipv4" and insert -- IPv4 --.

Column 7, line 7, in Claim 17, delete "Ipv6" and insert -- IPv6 --.

Column 7, line 34, in Claim 24, delete "Ipv4" and insert -- IPv4 --.

Signed and Sealed this
Twenty-second Day of November, 2011

David J. Kappos
*Director of the United States Patent and Trademark Office*